United States Patent
Mukai et al.

[11] Patent Number: 6,112,846
[45] Date of Patent: Sep. 5, 2000

[54] ELECTRIC POWER STEERING APPARATUS

[75] Inventors: Yoshinobu Mukai; Yoshiki Noro, both of Saitama-ken, Japan

[73] Assignee: Honda Giken Kogyo Kabushiki Kaisha, Tokyo, Japan

[21] Appl. No.: 09/140,957

[22] Filed: Aug. 27, 1998

[30] Foreign Application Priority Data

Sep. 1, 1997 [JP] Japan .................................. 9-236141

[51] Int. Cl.⁷ ........................................................ B62D 5/04
[52] U.S. Cl. ............................ 180/446; 180/443; 701/42; 318/432
[58] Field of Search .................................. 180/446, 443; 701/42; 318/432, 473, 609, 610

[56] References Cited

U.S. PATENT DOCUMENTS

| | | | |
|---|---|---|---|
| 5,481,457 | 1/1996 | Yamamoto et al. | 70/41 |
| 5,482,129 | 1/1996 | Shimizu | 180/443 |
| 5,732,373 | 3/1998 | Endo | 180/443 |
| 5,788,010 | 8/1998 | Mukai et al. | 180/446 |

*Primary Examiner*—Lanna Mai
*Assistant Examiner*—Hau Phan
*Attorney, Agent, or Firm*—Merchant & Gould P.C.

[57] ABSTRACT

An electric power steering apparatus includes a proportional plus integral control section incorporated in a control unit for achieving proportional plus integral control action of an offset between a target motor current to be supplied to an electric motor and a motor current actually flowing in the electric motor, and an overshoot diminishing section for controlling at least one of proportional sensitivity and integral gain of the proportional plus integral control section so as to diminish overshoot of the motor current occurring when the steering wheel is quickly turned until it reaches a steering lock position. With this arrangement, semiconductor devices used in the control unit for driving the electric motor are protected against damage caused when subjected to an overload resulting from the overshoot of the motor current.

10 Claims, 8 Drawing Sheets

ELECTRIC POWER STEERING APPARATUS

BACKGROUND OF THE INVENTION

1. Field of the Invention

The present invention relates to improvements in an electric power steering apparatus which provides power of an electric motor to the steering system of a vehicle to thereby reduce the manual steering effort or force needed to turn the steering wheel.

2. Description of the Related Art

Electric power steering apparatuses are known in which a steering torque produced in conjunction with a manual steering operation taken by the driver is detected by a steering torque sensor, a steering torque signal supplied from the steering torque sensor is converted into a target current signal, an offset or deviation between the target current signal and a motor current signal corresponding to a current flowing actually in the electric motor is corrected by PI (proportional plus integral) or PID (proportional plus integral plus derivative) control action to generate a corrected signal, and a motor control signal (such as a pulse-width modulation signal) generated on the basis of the corrected signal is used to drive the electric motor to apply a steering assist force or torque to the steering system of a vehicle.

In the known electric power steering apparatus, because the PI or PID control action is carried out while the motor current signal is fed back to the target current signal to rapidly reduce the offset between these two signals to zero (negative feedback), the motor current becomes equal in quantity to the target current to thereby enable the electric motor to provide a steering assist torque corresponding to the steering torque signal.

However, when the steering wheel is quickly turned in either direction until it reaches a rack end position (steering lock position), rotation of the electric motor is suddenly stopped with the result that a counterelectromotive force (counter emf.) of the electric motor disappears suddenly and a current corresponding to the disappeared counter emf. is added to the motor current, tending to cause overshoot of the motor current.

An excessive current (overcurrent) produced due to the motor current overshoot may exceed a maximum rating current of semiconductor devices used in a motor drive unit as switching elements for the PWM (pulse-width modulation) driving of the electric motor and thereby damages the semiconductor devices.

SUMMARY OF THE INVENTION

With the foregoing drawbacks of the prior art in view, it is an object of the present invention to provide an electric power steering apparatus which is capable of preventing overshoot of the motor current which would otherwise occur when the steering wheel is rapidly turned to a steering lock position.

According to the present invention, there is provided an electric power steering apparatus for a vehicle, comprising: a steering torque sensor for detecting a steering torque of a steering system of the vehicle and generating a steering torque signal corresponding to the detected steering torque; an electric motor for applying a steering assist force to the steering system; a motor current sensor for detecting a motor current flowing in the electric motor and generating a motor current signal corresponding to the detected motor current; and a control unit for controlling operation of the electric motor on the basis of at least the steering torque. The control unit includes a target current setting section for setting, on the basis of the steering torque signal, a target current to be supplied to the electric motor and generating a target current signal corresponding to the target current, a proportional plus integral control section for achieving proportional plus integral control action about an offset between the target current signal and the motor current signal so as to effect compensation of the offset, and an overshoot diminishing section operatively connected to the proportional plus integral control section for controlling at least one of a proportional sensitivity and an integral gain of the proportional plus integral control section so as to diminish overshoot occurring in the motor current.

Since the overshoot of the motor current is diminished by the overshoot diminishing section, semiconductor devices used as switching elements for driving the electric motor are protected against damage caused when subjected to an overload resulting from the overshoot of the motor current.

In one preferred embodiment of the present invention, the overshoot diminishing section changes the proportional sensitivity and/or the integral gain of the proportional plus integral control section on the basis of the motor current signal supplied from the motor current sensor. In another preferred embodiment of the present invention, the overshoot diminishing section changes the proportional sensitivity and/or the integral gain of the proportional plus integral control section on the basis of the offset between the target current signal and the motor current signal. The overshoot diminishing section increases the proportional sensitivity and/or the integral gain of the proportional plus integral control section when the overshoot occurs.

The overshoot diminishing section may include an overshoot estimating part for estimating the occurrence of the overshoot on the basis of one of the motor current signal and the offset between the target current signal and the motor current signal, and a proportional and integral coefficient setting part for setting a proportional coefficient and an integral coefficient corresponding to the output from the overshoot estimating part in order to control the proportional sensitivity and/or the integral gain of the proportional plus integral control section.

The overshoot estimating part preferably includes a predetermined value setter for setting a predetermined value greater than a maximum value of the target current, and a comparator for comparing largeness of the motor current signal and the predetermined value and providing a logical one signal when the motor current signal is equal to or greater than the predetermined value and a logical zero signal when the motor current signal is smaller than the predetermined value. The overshoot estimating part may alternatively include a predetermined value setter for setting a predetermined offset value which is equal to the difference between a predetermined value greater than a maximum value of the target current and the maximum value of the tartet current, and a comparator for comparing largeness of the offset and the predetermined offset value and providing a logical one signal when the offset is equal to or greater than the predetermined offset value and a logical zero signal when the offset is smaller than the predetermined offset value. The proportional and integral coefficient setting part, when it is supplied with the logical one signal from the comparator of the overshoot estimating part, increases the proportional coefficient and/or the integral coefficient to thereby increase the proportional sensitivity and/or the integral gain of the proportional plus integral control section.

The above and other objects, features and advantages of the present invention will become apparent to those versed in the art upon making reference to the following description and accompanying sheets of drawings in which certain preferred structural embodiments of the present invention are described by way of illustrative examples.

DETAILED DESCRIPTION OF THE PREFERRED EMBODIMENTS

Certain preferred embodiments of the present invention will be described in greater detail with reference to the accompanying drawings.

Figure 1:
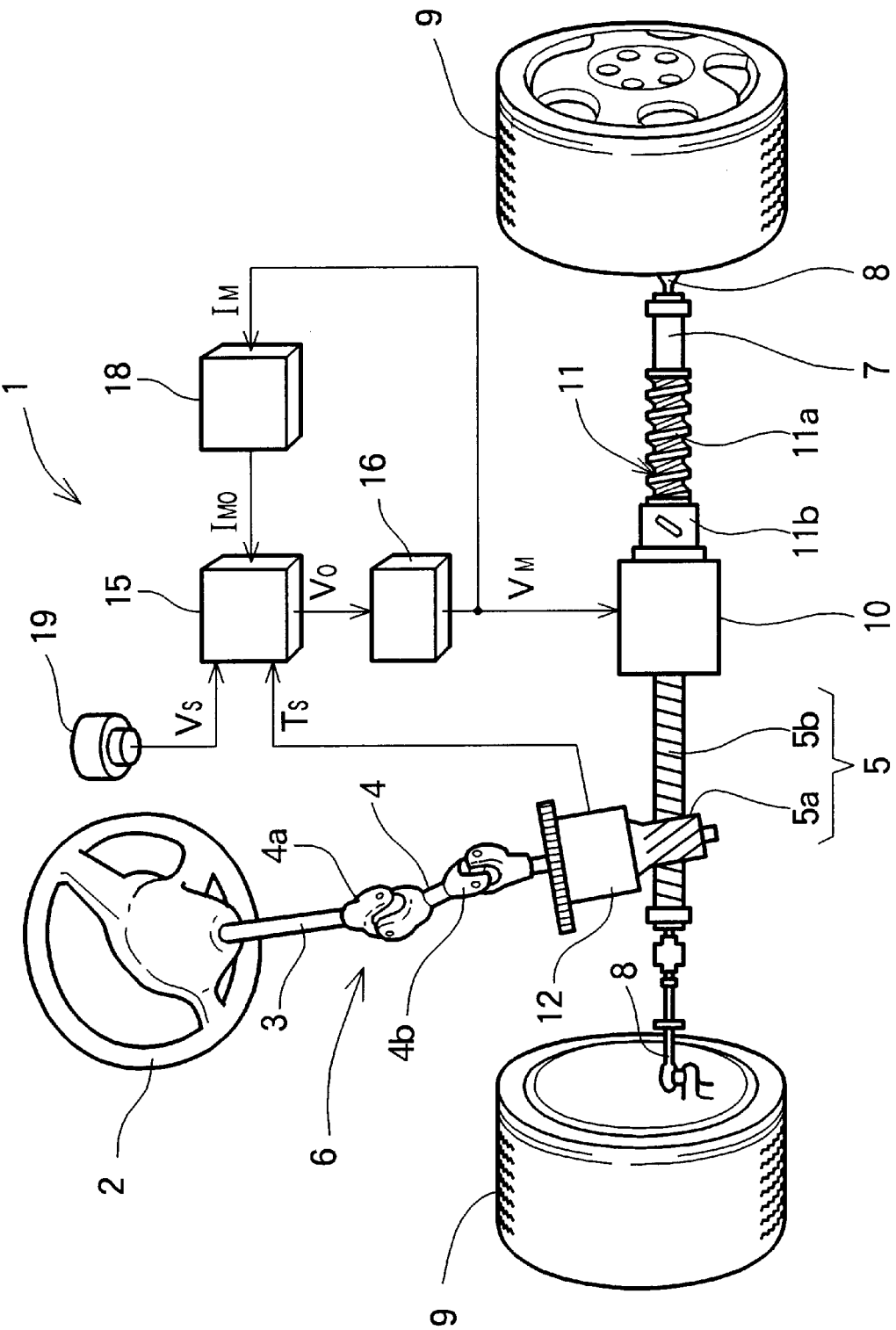
FIG. 1 is a diagrammatical view showing the general construction of an electric power steering apparatus according to a first embodiment of the present invention.

Referring now to FIG. 1, there is shown the general construction of an electric power steering apparatus for a vehicle according to a first embodiment of the present invention. The electric power steering apparatus 1 includes a steering wheel 2 firmly connected to one end (upper end) of a steering column or shaft 3, the other end (lower end) of the steering shaft 3 being operatively connected by a connecting shaft 4 having universal couplings 4a, 4b to a pinion 5a of a rack-and-pinion mechanism 5 contained in a steering gearbox (not shown). These parts 1–5 jointly constitute a manual steering force generating mechanism 6.

The rack-and-pinion mechanism 5 includes a rack shaft 7 having a rack 5b of gear teeth which is in mesh with the pinion 5a. Thus, rotation of the pinion 5a is converted into linear reciprocation of the rack shaft 7. The opposite ends of the rack shaft 7 are connected by tie rods 8, 8 to steerable left and right front wheels 9, 9.

When the steering wheel 2 is turned or rotated, the manual steering force generating mechanism 6 including the rack-and-pinion mechanism 5 causes the steerable front wheels 9, 9 to pivot or swivel and thereby changes the direction of movement of the vehicle.

To lighten the driver's effort needed to turn the steering wheel 2, an electric motor 10 is mounted concentrically with the rack shaft 7 so as to apply a steering assist torque to the rack shaft 7 via a ball-screw mechanism (often referred to as "ball-nut mechanism") 11. The ball-screw mechanism 11 is composed of a helical screw 11a threaded in a circumferential surface of the rack shaft 7, and a nut 11b integrally connected to an output shaft of the electric motor 10 and threadedly engaged with the screw 11a, with recirculating balls (not shown) disposed between the rack shaft 7 and the nut 11b.

The electric power steering apparatus further includes a steering torque sensor 12 disposed in the steering gearbox (not shown) for detecting the direction and magnitude of a steering torque applied to the steering system by the driver and generating a steering torque signal $T_S$ in the form of an analog electric signal corresponding to the detected steering torque. The steering torque signal $T_S$ is supplied to a control unit 15.

A motor current sensor 18 detects a motor current $I_M$ flowing actually in the electric motor 10 and generates a motor current signal $I_{MO}$ in the form of a digital electric signal corresponding to the detected motor current $I_M$. The motor current signal $I_{MO}$ is fed back to the control unit 15 (negative feedback).

A vehicle velocity sensor 19 detects a vehicle velocity and generates a vehicle velocity signal $V_S$ in the form of an electric pulse signal having a frequency corresponding to the detected vehicle velocity. The vehicle velocity signal $V_S$ is supplied to the control unit 15.

The control unit 15 is a microprocessor-based electronic control unit including various arithmetic and logic units, processors, signal generators and memories (none of them being shown). The control unit 15 generates, on the basis of the vehicle velocity signal $V_S$ and the steering torque signal $T_S$, a drive control signal $V_O$ (consisting, for example, of a combination of an ON signal and a PWM signal) which has been subjected to proportional(P) plus integral (I) control action, and thereby controls operation of a motor drive unit 16.

The control unit 15 also estimates (detects) overshoot of the motor current $I_M$ and controls the proportional sensitivity (gain) and/or the integral gain to diminish the overshoot of the motor current $I_M$.

The motor drive unit 16 comprises a bridge circuit consisting of four switching elements such as power field-effect transistors (FETs) or insulated-gate bipolar transistors (IGBTs). The motor drive unit 16 generates a motor voltage $V_M$ on the basis of the drive control signal $V_O$, and thereby drives the electric motor 10.

Figure 3:
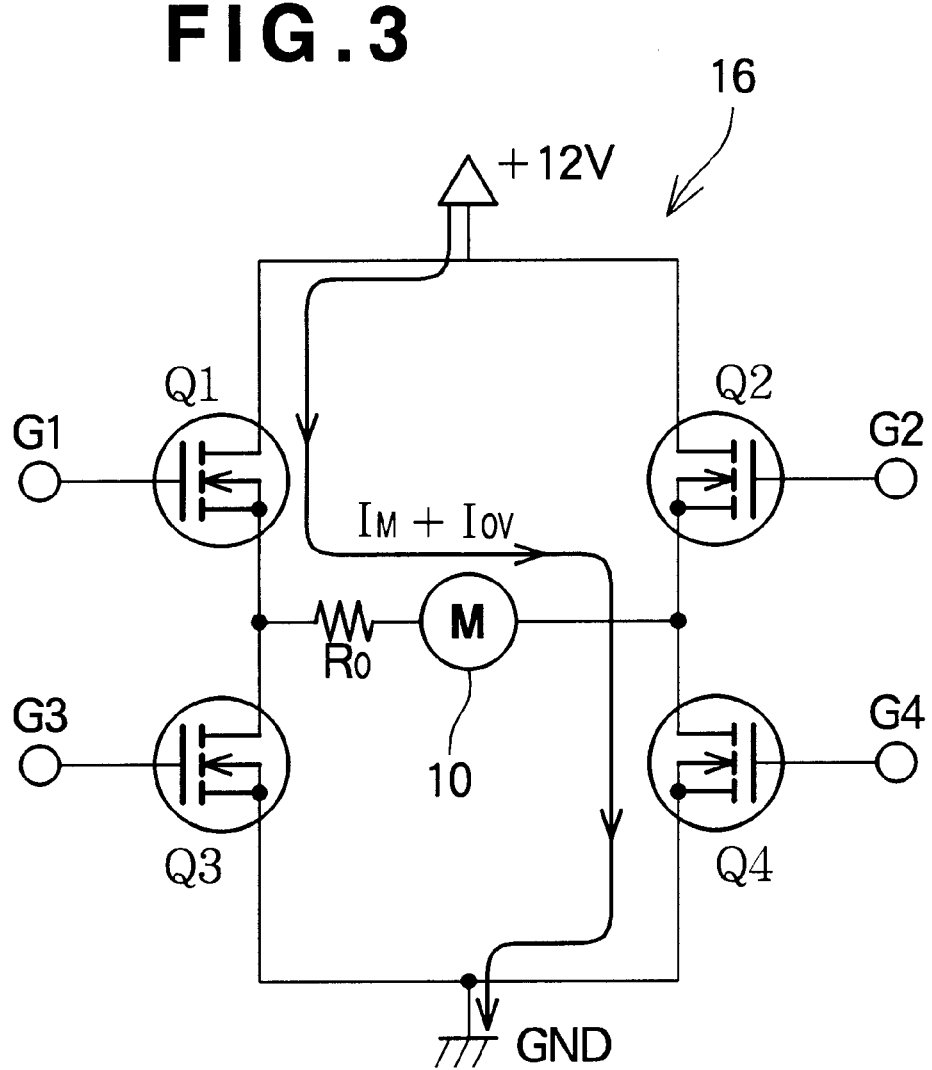
FIG. 3 is a circuit diagram of a motor drive unit of the electric power steering apparatus.

Reference is made to FIG. 3 which shows a circuit diagram of the motor drive unit 16. The motor drive unit 16 includes four power FETs Q1, Q2, Q3 and Q4 connected together to form an H-type bridge circuit and drives the electric motor 10 on the basis of the drive control signal $V_O$ supplied to the gates G1, G2, G3 and G4 of the respective power FETs Q1–Q4.

Now assuming that the steering wheel 2 (FIG. 1) is turned in the clockwise direction, the power FETs Q2 and Q3 are turned off while the power FETs Q1 and Q4 are turned on. This will cause a motor current $I_M$ to flow from a battery power source (12V) through the FET Q1, the electric motor 10 and the FET Q4 to a ground GND, as indicated by the arrows shown in FIG. 3. As a result, the electric motor 10 starts rotating in one direction (forward direction, for example) to apply a steering assist force or torque to the steering system to thereby reduce the manual string effort needed to swivel the front wheels 9, 9 (FIG. 1) in the clockwise direction.

When the steering wheel 2 is quickly turned in either direction until it reaches a steering lock position (rack end position), rotation of the electric motor 10 is suddenly stopped. As a result, a counter emf. which has been developed in the electric motor 10 disappears suddenly, and a current $I_{OV}$ corresponding to the disappeared counter emf. and the motor current $I_M$ corresponding to the target current signal are added together, tending to cause overshoot ($I_M + I_{OV}$) of the motor current.

Figure 2:
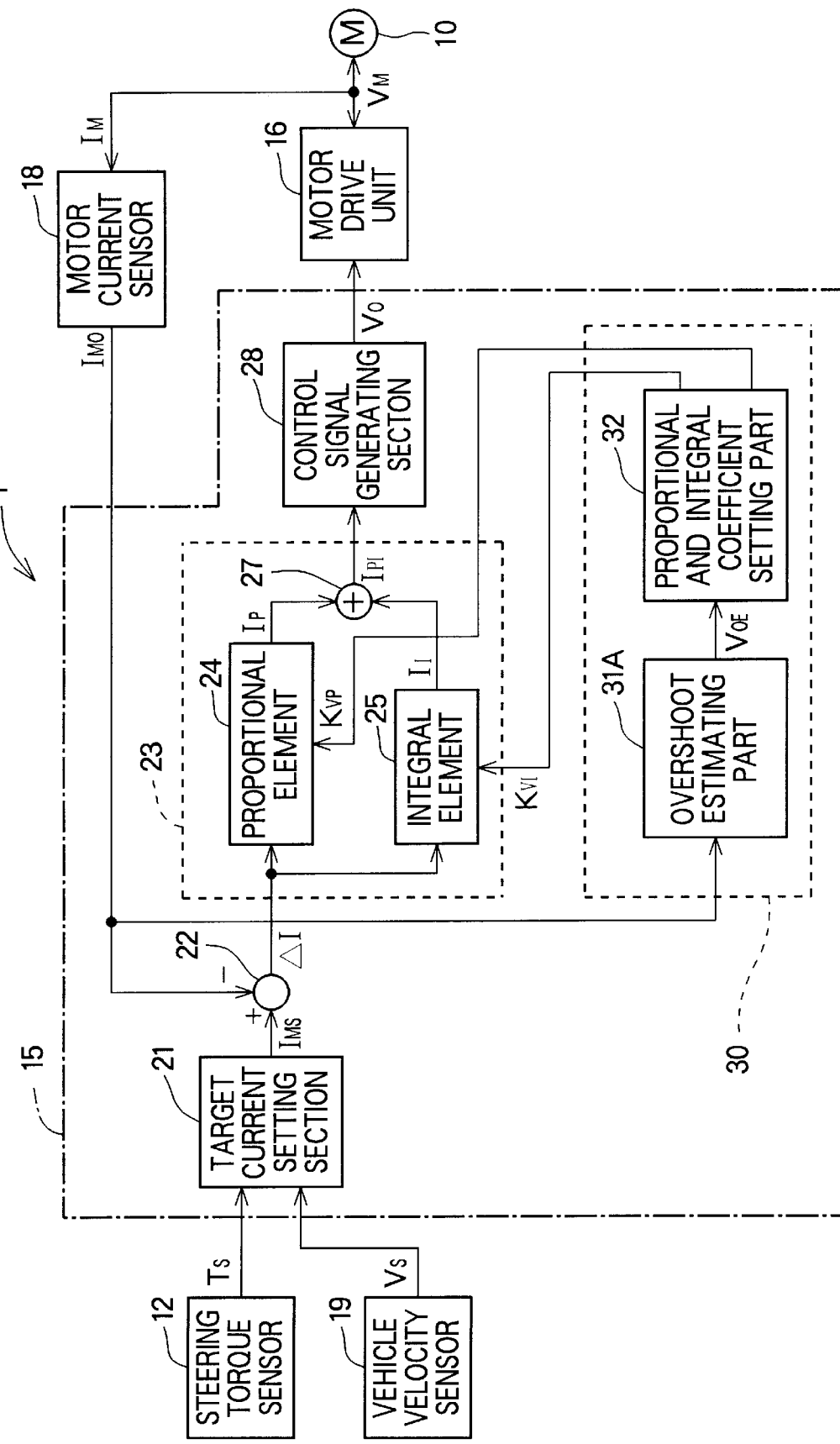
FIG. 2 is a block diagram showing a main portion of the electric power steering apparatus.

Reference is made to FIG. 2 which shows in block diagram a main portion of the electric power steering apparatus 1 shown in FIG. 1. As shown in this figure, the control unit 15 of the electric power steering apparatus 1 includes a target current setting means or section 21, an offset calculating means or section 22, a proportional plus integral control means or section 23, a control signal generating means or section 28, and an overshoot diminishing means or section 30.

The target current setting section 21 includes a memory such as a read-only memory (ROM) which stores on a permanent basis a table of correlated data about the steering torque signal $T_S$ and the target current signal $I_{MS}$ that are collected either theoretically or experimentally in advance with the vehicle velocity signal $V_S$ being taken as a parameter. The target current setting section 21 is constructed to perform analog-to-digital conversion of the steering torque signal $T_S$ supplied from the steering torque sensor 12, determine a target current signal $I_{MS}$ on the basis of the steering torque signal $T_S$ and by using the correlated data table stored in the ROM, and output the target current signal $I_{MS}$ to the offset calculating section 22.

The offset calculating section 22 comprises a subtractor or a software-controlled subtracting function (neither shown). This section 22 calculates an offset or difference between the target current signal $I_{MS}$ supplied from the target current setting section 21 and the motor current signal $I_M$ supplied from the motor current sensor 18 and supplies an offset signal $\Delta I$ (corresponding to the calculated offset $I_{MS}-I_M$) to the proportional plus integral control section 23.

The proportional plus integral control section 23 includes a proportional element 24 which generates a proportional gain $K_P$ to perform proportional control action, an integral element 25 which generates an integral sensitivity (integral gain) to perform integral control action, and an adder 27 which adds together output signals supplied from these two elements 24, 25.

The proportional element 24 and the integral element 25 are connected in parallel with each other so that a proportional signal $I_P$ obtained by multiplying the offset signal $\Delta I$ by the proportional gain $K_P$ and an integral signal $I_I$ obtained by time integral of the offset signal $\Delta I$ with the integral gain $K_I$ are supplied separately from the proportional element 24 and the integral element 25 to the adder 27.

The proportional element 24 has an arithmetic function which multiplies the proportional sensitivity (gain) $K_P$ by a proportional coefficient $K_{VP}$ output from the overshoot diminishing section 30. Similarly, the integral element 25 has an arithmetic function which multiplies the integral gain $K_I$ by an integral coefficient $K_{VI}$ output from the overshoot diminishing section 30.

The adder 27 adds together the proportional signal $I_P$ and the integral signal $I_I$ and supplies the resulting proportional plus integral signal $I_{PI}$ (=$I_P+I_I$) to the control signal generating section 28. Using the proportional and integral coefficients $K_{VP}$ and $K_{VI}$, the proportional plus integral signal $I_{PI}$ may be expressed by the following Equation.

$$I_{PI}=KV \cdot K_{VP} \cdot \Delta I + (K_I \cdot K_{VI}/\rho) \cdot \Delta I \qquad (1)$$

where $\rho$ is the Heaviside operator.

It appears from Equation (1) that the proportional plus integral signal $I_{PI}$ is variable with the proportional sensitivity (gain) $K_P$ and the integral gain $K_I$ which are also variable with the proportional coefficient $K_{VP}$ and the integral coefficient KVI, respectively.

The control signal generating section 28 includes a PWM signal generator (not shown) and generates a PWM signal corresponding in intensity and direction to the proportional plus integral signal $I_{PI}$ and supplies the PWM signal as the above-mentioned drive control signal $V_O$ to the motor drive unit 16. The motor drive unit 16 applies a motor drive voltage $V_M$ to the electric motor 10 to thereby rotate the electric motor 10.

The overshoot diminishing section 30 includes an overshoot estimating means or part 31 and a proportional and integral coefficient setting means or part 32.

The overshoot estimating part 31, when supplied with a motor current signal $I_{MO}$ having a greater intensity than a predetermined value $I_{MR}$ (FIG. 4) above a maximum value of the target current set by the target current setting section 21, estimates the motor current $I_M$ to be overshooting which may cause overcurrent (overload) of the electric motor 10 at each steering lock position and outputs an overshoot estimation signal $V_{OE}$ at a high (H) level (a logical one signal) to the proportional and integral coefficient setting part 32.

In all but except the above-mentioned case, the overshoot estimating part 31 outputs an overshoot estimation signal $V_{OE}$ at a low (L) level (logical zero signal) to the proportional and integral coefficient setting part 32.

The proportional and integral coefficient setting part 32 is comprised of a memory such as a ROM which stores on a permanent basis a table of correlated data collected either theoretically or experimentally in advance about the overshoot estimation signal $V_{OE}$ and the proportional and integral coefficients $K_{VP}$ and $K_{VI}$. The correlated data table may include $K_{VP}=K_{VI}=1$ when $V_{OE}$ is at the low level, and $K_{VP}=K_{VI}=2$ when $V_{OE}$ is at the high level. The proportional and integral coefficient setting part 32 when supplied with a high-level overshoot estimation signal $V_{OE}$ retrieves, from the correlated data table stored in the ROM, a set of proportional and integral coefficients $K_{VP}$ and $K_{VI}$ (=2) corresponding to the supplied overshoot estimation signal $V_{OE}$, and outputs the proportional coefficient $K_{VP}$ (=2) and the integral coefficient $K_{VI}$ (=2) to the proportional element 24 and the integral element 25, respectively, to increase the proportional sensitivity (gain) $K_P$ and the integral gain $K_I$ of PI control action to thereby diminish the overshoot of the motor current $I_M$. The same effect can be attained when only the proportional sensitivity (gain) $K_P$ is increased.

The overshoot diminishing section 30 of the foregoing arrangement diminishes overshoot which may occur in the motor current $I_{M+}$ when the steering wheel 2 (FIG. 1) is turned in the clockwise direction until it reaches one of two steering lock (rack end) positions. Similarly, overshoot of the motor current $I_{M-}$ which may occur when the steering wheel is turned in the counterclockwise direction until it reaches the other steering lock position is diminished by the overshoot diminishing section 30.

Figure 4:
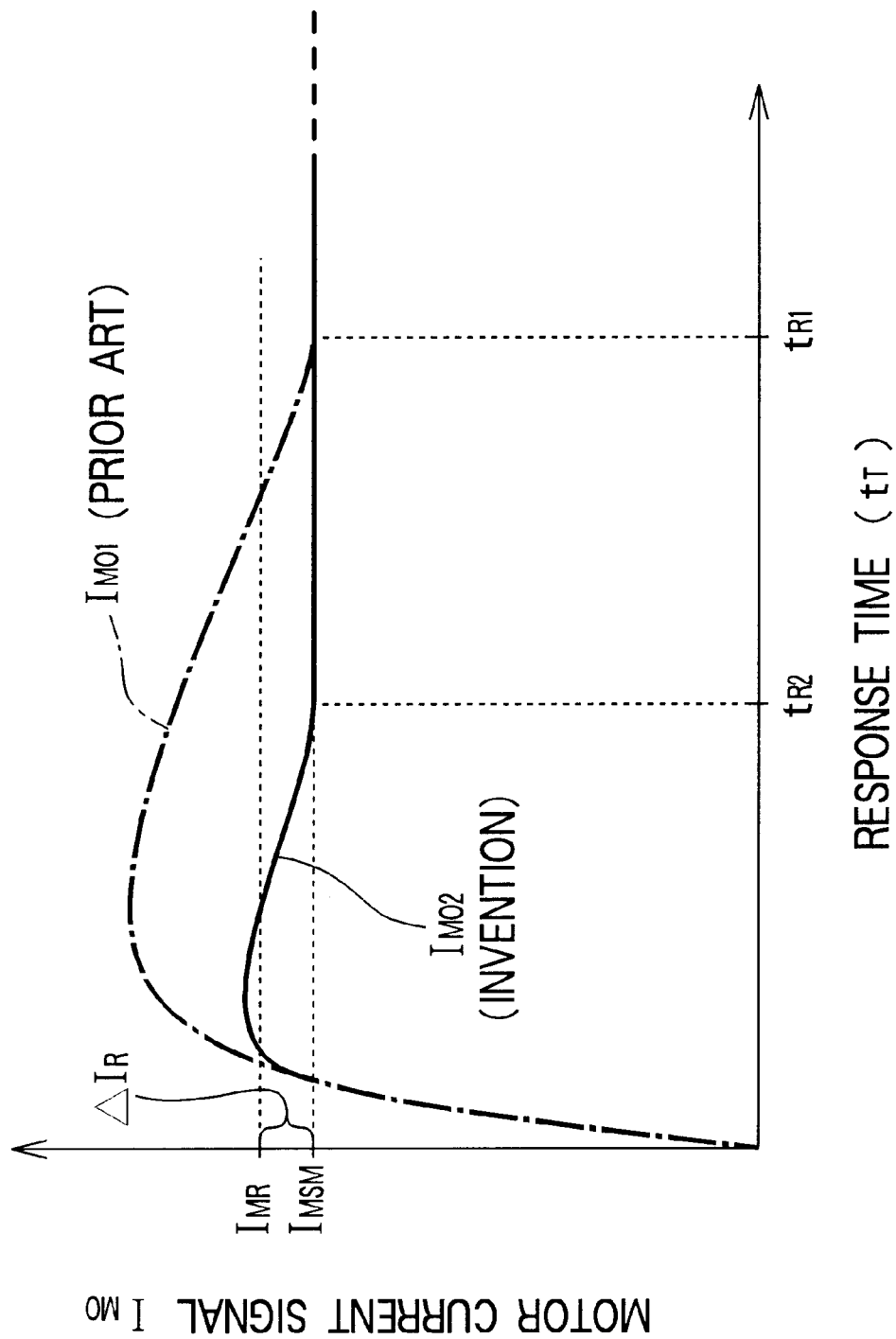
FIG. 4 is a graph showing the response characteristic of the motor current according to the present invention and that of the motor current according to the prior art both observed when the steering wheel is turned to a steering lock position.

Reference is made to FIG. 4 which shows the response characteristics of the motor current signals observed when the steering wheel is quickly turned to a steering lock position. In FIG. 4, reference character $I_{MSM}$ denotes a maximum value of the target current set by the target current setting section 21, and the above-mentioned predetermined value $I_{MR}$ is set to be larger than the maximum target current value $I_{MSM}$. The motor current signal $I_{MO1}$ indicated by the phantom line denotes a motor current signal of the conventional electric power steering apparatus. As is apparent from FIG. 4, the motor current signal $I_{MO1}$ has a transitional rise greatly beyond the predetermined value $I_{MR}$. This means that overshoot occurs in the motor current signal $I_{MO1}$.

In the case of the motor current signal $I_{MO2}$ of the electric power steering apparatus 1 according to the present invention, when it exceeds the predetermined value $I_{MR}$, at least one of the proportional sensitivity (gain) and the integral gain of the proportional plus integral control section 23 is increased by the overshoot diminishing section 30 to diminish overshoot of the motor current signal $I_{MO2}$ in such a manner that the motor current signal $I_{MO2}$, as indicated by the solid line shown in FIG. 4, smoothly comes to the level of the maximum value $I_{MSM}$ of the target motor current signal in a time $t_{R2}$ much shorter than that $t_{R1}$ of the motor current signal $I_{MO1}$.

According to the electric power steering apparatus 1 of the foregoing embodiment, overshoot of the motor current signal $I_{MO}$ occurring at a steering lock position is estimated by the overshoot diminishing section 30 on the basis of a motor current signal $I_{MO}$. Based on this estimation, the overshoot diminishing section 30 increases at least one of the proportional sensitivity (gain) and the integral gain of the proportional plus integral control section 23 to diminish the overshoot of the motor current $I_{MO}$ in such a way that the motor current rapidly approaches the target motor current set by the target current setting section 21.

Figure 5:
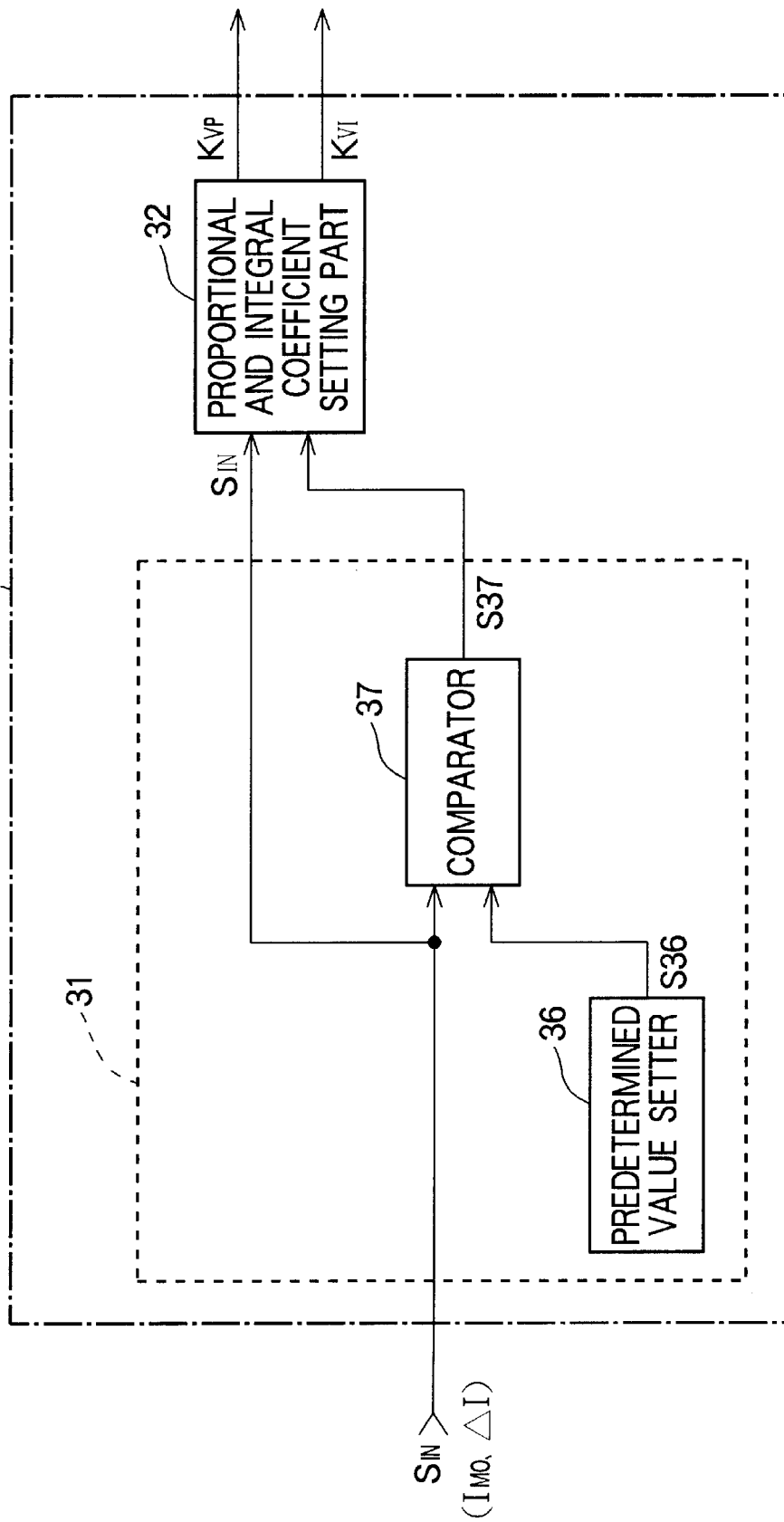
FIG. 5 is a block diagram showing an overshoot estimating part of the electric power steering apparatus.

FIG. 5 shows in block diagram an arrangement of the overshoot estimating part 31 of the overshoot diminishing section 30. The overshoot estimating part 31 includes a predetermined value setting means or setter 36 and a comparing means or comparator 37.

The predetermined value setter 36 outputs to the comparator 37 a predetermined value signal S36 which corresponds to the value of an input signal $S_{IN}$ supplied when the steering wheel is brought to a steering lock position by a rapid or sharp steering operation. In the illustrated embodiment, since the input signal $S_{IN}$ is a motor current signal $I_{MO}$ indicative of a motor current $I_M$ flowing in the electric motor 10, the predetermined value signal S36 is set to have the predetermined value $I_{MR}$ (greater than the maximum value IMR) as shown in FIG. 4. The input signal $S_{IN}$ may alternatively be an offset signal $\Delta I$ output from the offset calculating section 22 in which instance the predetermined signal S36 is set to have a predetermined offset value $\Delta I_R$ which is equal to the difference between the predetermined value $I_{MR}$ and the maximum value IMR, as shown in FIG. 4.

The comparator 37 compares an absolute value of the input signal SIN and an absolute value of the predetermined value signal S36 and outputs to the proportional and integral coefficient setting part 32 a comparison signal S37 at a high (H) level (logical one signal) when $S_{IN} \geq S36$ and a comparison signal S37 at a low (L) level (logical zero signal) when $S_{IN} < S36$.

Figure 6A:
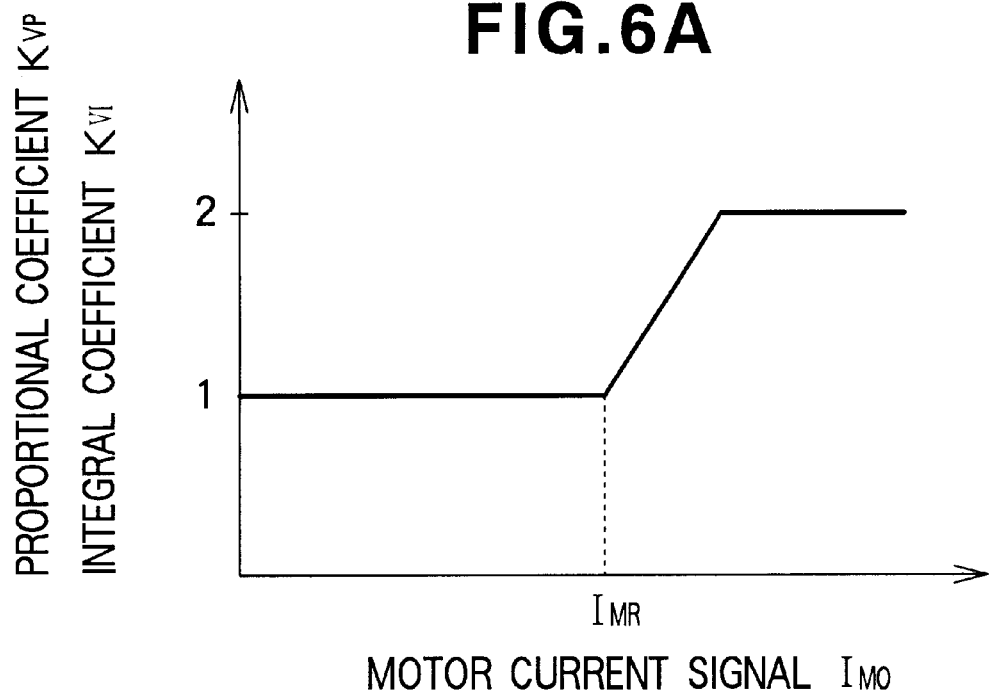
FIG. 6A is a graphical representation of the characteristic (gain) of a proportional plus integral coefficient setting part drawn with respect to the motor current signal.
Figure 6B:
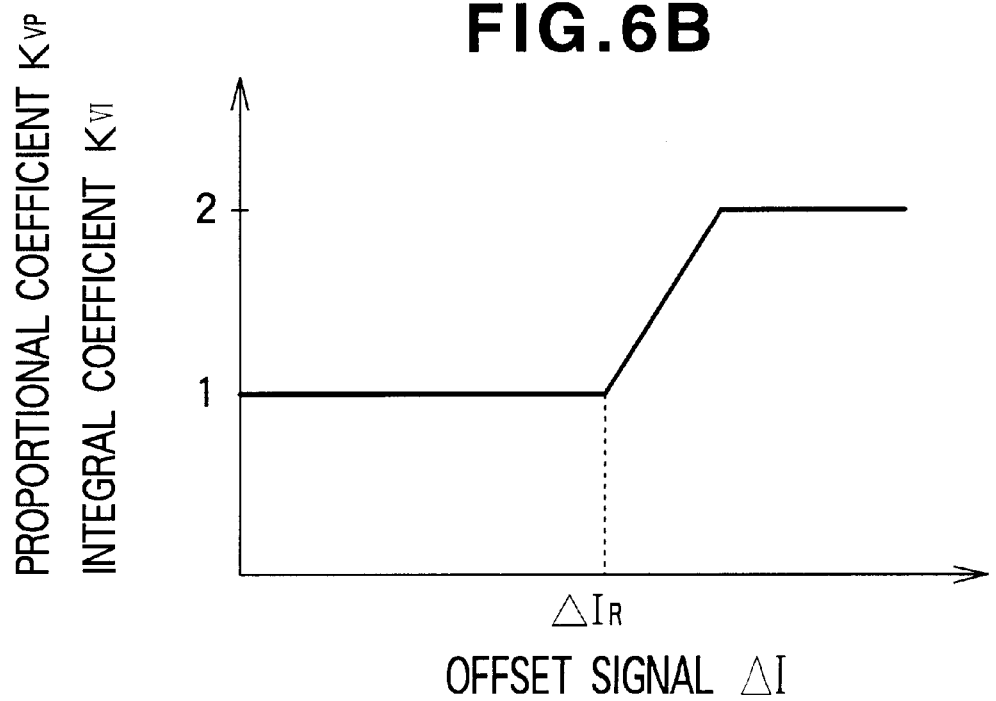
FIG. 6B is a view similar to FIG. 6A, but showing the characteristic (gain) of the proportional and integral coefficient setting part drawn with respect to an offset between the target current signal and the motor current signal.

The proportional and integral coefficient setting part 32 operates on the basis of the comparison signal S37. When the comparison signal S37 is a logical one signal, the proportional and integral coefficient setting part 32 is activated and thereby outputs a proportional coefficient $K_{VP}=2$ and an integral coefficient $K_{VI}=2$, such as shown in FIGS. 6A and 6B, to the proportional element 24 (FIG. 2) and the integral element 25 (FIG. 2), respectively. Conversely, when the comparison signal S37 is a logical zero signal, this part 32 outputs a proportional coefficient $K_{VP}=1$ and an integral coefficient $K_{VI}=1$, such as shown in FIGS. 6A and 6B, to the proportional element 24 and the integral element 25, respectively.

Figure 7:
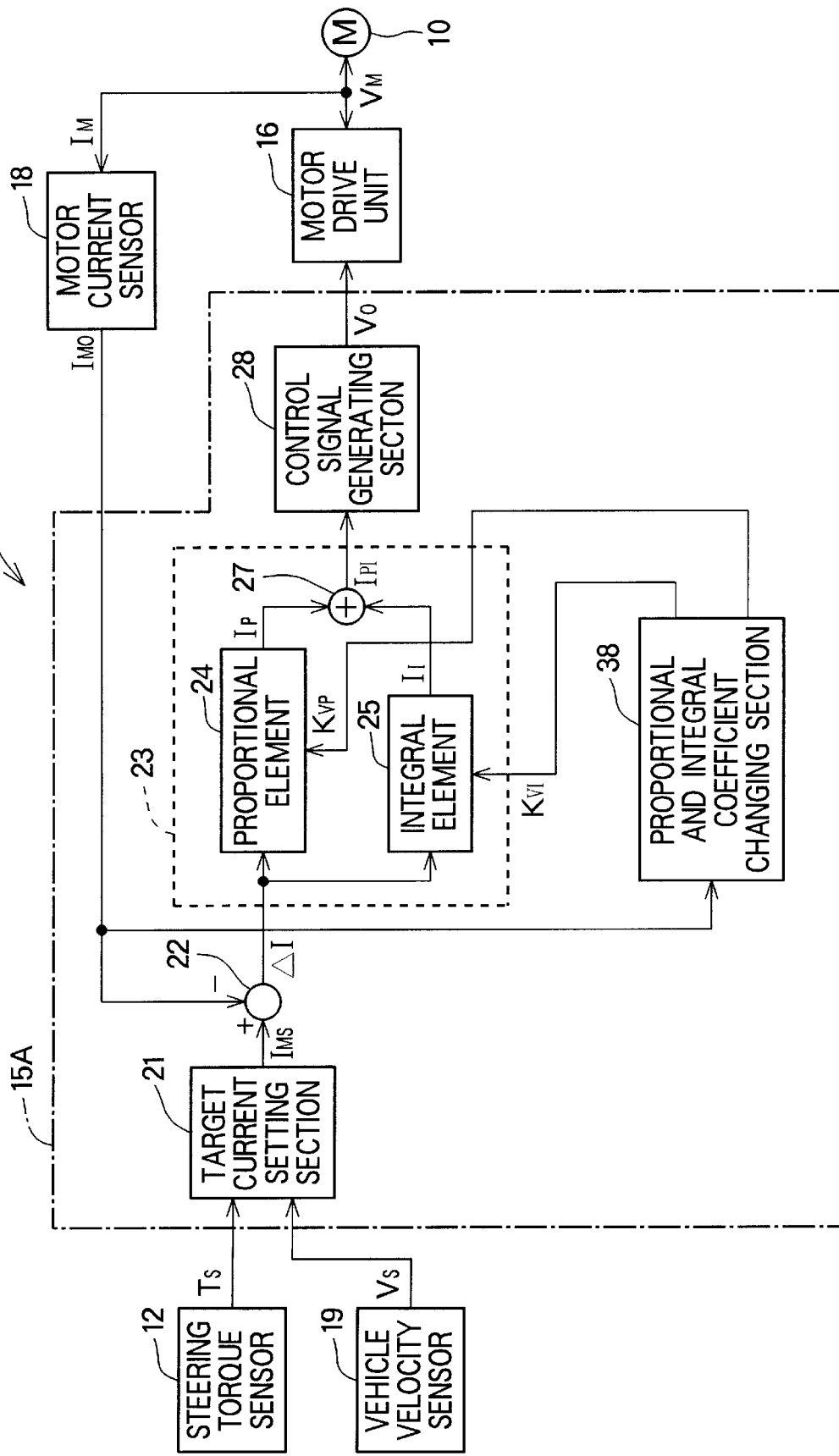
FIG. 7 is a block diagram showing a main portion of an electric power steering apparatus according to a second embodiment of the present invention.

FIG. 7 shows in block diagram of a main portion of an electric power steering apparatus 1A according to a second embodiment of the present invention. The electric power steering apparatus 1A has a control unit 15A including a target current setting means or section 21, an offset calculating means or section 22, a proportional plus integral control means or section 23, a control signal generating means or section 28, and a proportional and integral coefficient changing means or section 38. These parts which are like or corresponding to those of the first embodiment shown in FIG. 2 are designated by the same reference characters, and a further description thereof will be omitted.

The proportional and integral coefficient changing section 38 includes a memory such as a ROM which stores on a permanent basis a table of correlated data collected either theoretically or experimentally in advance about the motor current signal $I_{MO}$ and the proportional and integral coefficients $K_{VP}$ and $K_{VI}$. When a motor current signal $I_{MO}$ which may include overshoot of the motor current $I_M$ is supplied from a motor current sensor 18 to the proportional and integral coefficient changing section 38, the proportional and integral coefficient changing section 38 retrieves, from the correlated data table stored in the ROM, a proportional coefficient $K_{VP}$ and an integral coefficient $K_{VI}$ that are corresponding to the supplied motor current signal $I_{MO}$, and outputs these two retrieved coefficients $K_{VP}$ and $K_{VI}$ respectively to a proportional element 24 and an integral element 25 of the proportional plus integral control section 23. The correlated data table is exemplified in FIG. 6A.

The proportional element 24 of the proportional plus integral control section 23 multiplies the proportional sensitivity (gain) $K_P$ by the proportional coefficient $K_{VP}$ to change the proportional sensitivity $K_P$, and outputs to an adder 27 a proportional signal $I_P$ obtained by multiplying an offset signal $\Delta I$ by the changed proportional sensitivity (gain) $K_P$.

Similarly, the integral element 25 of the proportional plus integral control section 23 multiplies the integral gain $K_I$ by the integral coefficient $K_{VI}$ to change the integral gain $K_I$, and outputs to the adder 27 an integral signal $I_I$ obtained by applying integral control action to the offset signal $\Delta I$ using the changed integral gain $K_I$.

The adder 27 adds the proportional signal $I_P$ and the integral signal $I_I$ to generate a proportional plus integral signal $I_{PI}$ ($I_P+I_I$) and outputs the proportional plus integral signal $I_{PI}$ to the control signal generating section 28.

When overshoot occurs in the motor current $I_M$ upon arrival of the steering wheel at a steering lock position at the end of a sharp steering operation, the proportional and integral coefficient changing section 38 changes the proportional coefficient $K_{VP}$ and the integral coefficient $K_{VI}$ on the basis of the motor current signal $I_{MO}$ to increase the proportional sensitivity (gain) $K_P$ and the integral gain $K_I$ to thereby diminish the motor current overshoot in such a way that the motor current $I_M$ soon approaches the target motor current signal value. The same effect can also be attained when only one of the proportional sensitivity (gain) $K_P$ and the integral gain $K_I$ is increased by changing the corresponding coefficient $K_{VP}$ or $K_{VI}$. It is therefore apparent that the proportional and integral coefficient changing section 38 corresponds in function to the overshoot diminishing section 30 of the first embodiment shown in FIG. 2.

Figure 8:
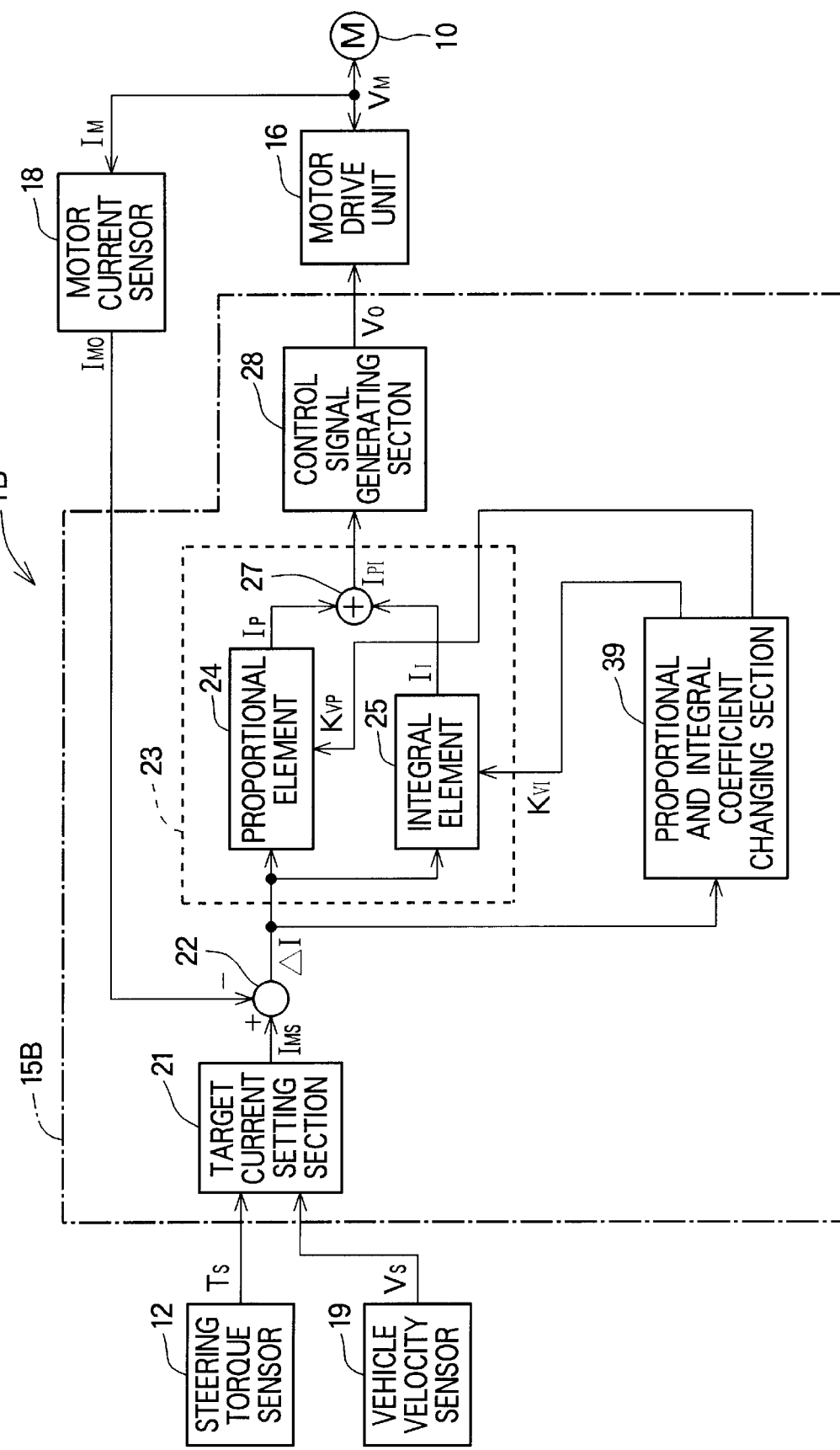
FIG. 8 is a block diagram showing a main portion of an electric power steering apparatus according to a third embodiment of the present invention.

FIG. 8 shows in block diagram a main portion of an electric power steering apparatus 1B according to a third embodiment of the present invention. The apparatus 1B differs from the apparatus 1A of the second embodiment shown in FIG. 7 in that the control unit 15B includes a proportional and integral coefficient changing means or section 39 so designed as to change at least one of the proportional coefficient (gain) $K_{VP}$ and the integral coefficient $K_{VI}$ on the basis of the offset signal $\Delta I$ supplied from the offset calculating section 22.

The proportional and integral coefficient changing section 39 includes a memory such as a ROM which stores on a permanent basis a table of correlated data collected either theoretically or experimentally in advance about the offset signal $\Delta I$ and the proportional and integral coefficients $K_{VP}$ and $K_{VI}$. When an offset signal $\Delta I$ is supplied from the offset calculating section 22 to the proportional and integral coefficient changing section 39, the proportional and integral coefficient changing section 39 retrieves, from the correlated data table stored in the ROM, a proportional coefficient $K_{VP}$ and an integral coefficient $K_{VI}$ that are corresponding to the supplied offset signal $\Delta I$, and outputs these two retrieved coefficients $K_{VP}$ and $K_{VI}$ respectively to the proportional element 24 and the integral element 25 of the proportional plus integral controlling section 23. The correlated data table is exemplified in FIG. 6B.

The proportional element 24 multiplies the proportional sensitivity (gain) $K_P$ by the proportional coefficient $K_{VP}$ to change the proportional sensitivity (gain) $K_P$, and outputs to an adder 27 a proportional signal $I_P$ obtained by multiplying the offset signal $\Delta I$ by the changed proportional sensitivity (gain) $K_P$.

Similarly, the integral element 25 multiplies the integral gain $K_I$ by the integral coefficient $K_{VI}$ to change the integral gain $K_I$, and outputs to the adder 27 an integral signal $I_I$ obtained by applying integral control action to the offset signal $\Delta I$ using the changed integral gain $K_I$.

The adder 27 adds the proportional signal $I_P$ and the integral signal $I_I$ to generate a proportional plus integral signal $I_{PI}$ ($I_P+I_I$) and outputs the proportional plus integral signal $I_{PI}$ to the control signal generating section 28.

When the steering wheel is rapidly brought to a steering lock position, overshoot may occurs in the motor current $I_M$. In this instance, the proportional and integral coefficient changing section 39 changes the proportional coefficient $K_{VP}$ and the integral coefficient $K_{VI}$ on the basis of the offset signal $\Delta I$ so as to increase the proportional sensitivity (gain) $I_P$ and the integral gain $I_P$, respectively, and thereby diminishes the motor current overshoot in such a way that the motor current $I_M$ soon approaches the target motor current signal value. The same effect can also be attained when only one of the proportional sensitivity (gain) $K_P$ and the integral gain $K_I$ is increased by changing the corresponding coefficient $K_{VP}$ or $K_{VI}$. The proportional and integral coefficient changing section 39 appears to correspond in function to the overshoot diminishing section 30 of the first embodiment shown in FIG. 2.

As described above, the electric power steering apparatus of the present invention includes a proportional plus integral control section incorporated in a control unit for achieving proportional plus integral control action in respect of an offset between a target motor current to be supplied to an electric motor and a motor current actually flowing in the electric motor, and an overshoot diminishing section for controlling at least one of proportional sensitivity and integral gain of the proportional plus integral control section so as to diminish overshoot of the motor current occurring when the steering wheel is quickly turned until it reaches a steering lock position. With this arrangement, semiconductor devices used in the control unit for driving the electric motor are protected against damage caused when subjected to an overload resulting from the overshoot of the motor current.

Obviously, various minor changes and modifications of the present invention are possible in the light of the above teaching. It is to be understood that within the scope of the appended claims the present invention may be practiced otherwise than as specifically described.

What is claimed is:

1. An electric power steering apparatus for a vehicle, comprising:

a steering torque sensor for detecting a steering torque of a steering system of the vehicle and generating a steering torque signal corresponding to the detected steering torque;

an electric motor for applying a steering assist force to the steering system;

a motor current sensor for detecting a motor current flowing in said electric motor and generating a motor current signal corresponding to the detected motor current; and a control unit for controlling operation of said electric motor on the basis of at least the steering torque, said control unit including a target current setting section for setting, on the basis of said steering torque signal, a target current to be supplied to said electric motor and generating a target current signal corresponding to the target current, a proportional plus integral control section for achieving proportional plus integral control action about an offset between said target current signal and said motor current signal so as to effect compensation of said offset, and an overshoot diminishing section operatively connected to said proportional plus integral control section for controlling at least one of a proportional sensitivity and an integral gain of said proportional plus integral control section so as to diminish overshoot occurring in the motor current, wherein said overshoot diminishing section changes said proportional sensitivity and/or said integral gain of said proportional plus integral control section on the basis of said motor current signal supplied from said motor current sensor.

2. An electric power steering apparatus according to claim 1, wherein said overshoot diminishing section increases said proportional sensitivity and/or said integral gain of said proportional plus integral control section when the overshoot occurs.

3. An electric power steering apparatus according to claim 1, wherein said overshoot diminishing section increases said proportional sensitivity and/or said integral gain of said proportional plus integral control section when the overshoot occurs.

4. An electric power steering apparatus for a vehicle, comprising:

a steering torque sensor for detecting a steering torque of a steering system of the vehicle and generating a steering torque signal corresponding to the detected steering torque;

an electric motor for applying a steering assist force to the steering system;

a motor current sensor for detecting a motor current flowing in said electric motor and generating a motor current signal corresponding to the detected motor current; and a control unit for controlling operation of said electric motor on the basis of at least the steering torque, said control unit including a target current setting section for setting, on the basis of said steering torque signal, a target current to be supplied to said electric motor and generating a target current signal corresponding to the target current, a proportional plus integral control section for achieving proportional plus integral control action about an offset between said target current signal and said motor current signal so as to effect compensation of said offset, and an overshoot diminishing section operatively connected to said proportional plus integral control section for controlling at least one of a proportional sensitivity and an integral gain of said proportional plus integral control section so as to diminish overshoot occurring in the motor current, wherein said overshoot diminishing section changes said proportional sensitivity and/or said integral gain of said proportional plus integral control section on the basis of said offset between said target current signal and said motor current signal.

5. An electric power steering apparatus according to claim 4, wherein said overshoot diminishing section increases said proportional sensitivity and/or said integral gain of said proportional plus integral control section when the overshoot occurs.

6. An electric power steering apparatus for a vehicle, comprising:

a steering torque sensor for detecting a steering torque of a steering system of the vehicle and generating a steering torque signal corresponding to the detected steering torque;

an electric motor for applying a steering assist force to the steering system;

a motor current sensor for detecting a motor current flowing in said electric motor and generating a motor current signal corresponding to the detected motor current; and a control unit for controlling operation of said electric motor on the basis of at least the steering torque, said control unit including a target current setting section for setting, on the basis of said steering torque signal, a target current to be supplied to said electric motor and generating a target current signal corresponding to the target current, a proportional plus integral control section for achieving proportional plus integral control action about an offset between said target current signal and said motor current signal so as to effect compensation of said offset, and an overshoot diminishing section operatively connected to said proportional plus integral control section for controlling at least one of a proportional sensitivity and an integral gain of said proportional plus integral control section so as to diminish overshoot occurring in the motor current, wherein said overshoot diminishing section includes an overshoot estimating part for estimating the occurrence of said overshoot on the basis of one of said motor current signal and said offset between said target current signal and said motor current signal, and a proportional and integral coefficient setting part for setting a proportional coefficient and an integral coefficient corresponding to the output from said overshoot estimating part in order to control said proportional sensitivity and/or said integral gain of said proportional plus integral control section.

7. An electric power steering apparatus according to claim 6, wherein said overshoot estimating part includes a predetermined value setter for setting a predetermined value greater than a maximum value of the target current, and a comparator for comparing largeness of said motor current signal and said predetermined value and providing a logical one signal when said motor current signal is equal to or greater than said predetermined value and a logical zero signal when said motor current signal is smaller than said predetermined value.

8. An electric power steering apparatus according to claim 7, wherein said proportional and integral coefficient setting part, when it is supplied with said logical one signal from said comparator of said overshoot estimating part, increases said proportional coefficient and/or said integral coefficient to thereby increase said proportional sensitivity and/or said integral gain of said proportional plus integral control section.

9. An electric power steering apparatus according to claim 6, wherein said overshoot estimating part includes a predetermined value setter for setting a predetermined offset value which is equal to the difference between a predetermined value greater than a maximum value of the target current and said maximum value of the target current, and a comparator for comparing largeness of said offset and said predetermined offset value and providing a logical one signal when said offset is equal to or greater than said predetermined offset value and a logical zero signal when said offset is smaller than said predetermined offset value.

10. An electric power steering apparatus according to claim 9, wherein said proportional and integral coefficient setting part, when it is supplied with said logical one signal from said comparator of said overshoot estimating part, increases said proportional coefficient and/or said integral coefficient to thereby increase said proportional sensitivity and/or said integral gain of said proportional plus integral control section.

* * * * *